Figure 1:
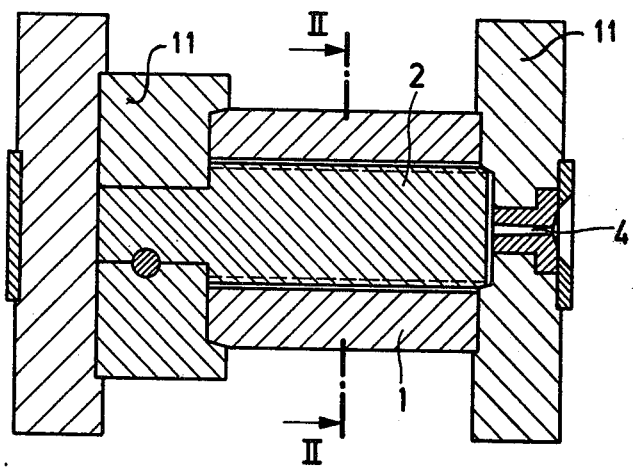

United States Patent [19]

Breher

[11] 4,174,367
[45] Nov. 13, 1979

[54] FORM TOOL FOR PRODUCTION OF A REINFORCED HOSE PIECE

[75] Inventor: Rudolf Breher, Porta Westfalica, Fed. Rep. of Germany

[73] Assignee: Breco Kunststoffverarbeitungs-GmbH & Co. KG, Porta Westfalica, Fed. Rep. of Germany

[21] Appl. No.: 854,352

[22] Filed: Nov. 23, 1977

[30] Foreign Application Priority Data

Nov. 26, 1976 [DE] Fed. Rep. of Germany ....... 2653741

[51] Int. Cl.² ........................ B29F 00/00; B23B 31/06
[52] U.S. Cl. ..................................... 264/261; 249/96; 425/123; 425/129 R
[58] Field of Search ................... 425/117, 129 R, 127, 425/123; 249/96, 97; 264/261, 262

[56] References Cited

U.S. PATENT DOCUMENTS

| 2,924,850 | 2/1960 | Schultz | 249/97 |
| 3,103,703 | 9/1963 | Ludewig | 249/96 |

Primary Examiner—William R. Briggs
Attorney, Agent, or Firm—Martin A. Farber

[57] ABSTRACT

A form tool for the production of a hose piece from an injectable material with wire-, rope- or cable-, or thread- shaped reinforcement inserts made of metal, textile or the like, the reinforcement inserts extending in the circumferential direction of the hose piece, comprising a mould sleeve and a mould core, which form an annular cylindrical hollow mould space therebetween, whereby on the periphery of the mould core, extending in the axial direction of the latter, supporting ribs for distancing of the reinforcement inserts are arranged spaced from the periphery of the mould core, and whereby the supporting ribs have recesses in which there engage the reinforcement inserts which are wound on the supporting ribs. The form tool is formed as an injection mould with an injection position arranged on a face edge of the hollow mould space, wherein the recesses are respectively formed sawtooth-like with a steep flank supporting the reinforcement inserts in the axial injection direction and with a flank ascending flatly inclined counter to the direction of injection.

7 Claims, 3 Drawing Figures

FORM TOOL FOR PRODUCTION OF A REINFORCED HOSE PIECE

The invention relates to a form tool for the production of a hose or tube piece from an injectable material with wire-, rope- or cable-, or thread-shaped reinforcement inserts made of metal, textile or the like, the reinforcement inserts extending in the circumferential direction of the hose piece, comprising a mould sleeve and a mould core, which form an annular cylindrical hollow mould space therebetween, whereby on the periphery of the mould core, extending in the axial direction of the latter, winding projections for spacing of the reinforcement inserts are arranged at a distance from the periphery of the mould core, and whereby the winding projections have recesses in which there engage the reinforcement inserts which are wound on the winding projections.

From German patent No. 1,028,322 a mould tool of the previously mentioned type is known which serves as a casting mould. By casting of a reinforced hose piece with the use of this known casting mould, the mould core which is wound coil-like with the wire-shaped reinforcement inserts, is immersed in the mould sleeve, the latter being open at the upper end and partially filled with plasticized material, whereby the material fills the hollow mould space without pressure. With this casting of a fortified or reinforced hose piece, the flat channel-shaped recesses which are employed on the winding projections with this known casting mould during the casting process suffice to fix the reinforcement inserts against an axial displacement on the winding projections. The reinforcement inserts even still can be pressed out from these flat channel-shaped recesses when the cooled and solidified hose piece is to be axially stripped from the mould core. It has been attempted to redesign these known casting moulds into an injection mould in order to be able to produce the reinforced hose piece by the substantially more economical injection moulding. In this manner it was shown that because of the pushing-out-of-the-way injection pressure in the axial direction of the hollow mould space, the flat channel-shaped recesses of the known casting mould no longer are sufficient to secure the reinforcement inserts against a displacement on the winding projections during the injection processes. The injection methods require substantially deeper channels for a non-displaceable mounting of the reinforcement inserts on the winding projections. These deeper channels however made it impossible to strip the finished reinforced hose piece from the mould core, and for the formation of the reinforced hose piece consequently they required a divided multi-part mould core which could be reduced in diameter in order to be able to remove the finished reinforced hose piece from the mould core. This multi-part divided construction of the mould core, particularly with the use of the injection mould for the production of precise reinforced gear or toothed belts, requires high precision and is connected with considerable tool costs which adversely affect the advantage of the injection methods compared to the casting methods.

The invention solves the previously described problem in a surprisingly simple way in the manner that, with formation of the form tool as an injection mould with an injection channel arranged at a front face of the hollow mould space, the recesses are formed sawtooth-like with a steep flank supporting the reinforcement inserts in the axial injection direction and with a flank ascending flatly inclined counter to the injection direction. In this manner with simplest means it is achieved that on the one hand during the injection process the reinforcement inserts are exactly mounted by the recesses and are reliably secured against axial displacement, and on the other hand however as practical tests have shown, in the removal direction counter to the injection direction without anything further, the reinforcement inserts can climb over the flatly inclined flanks out of the recesses and can be stripped over the mould core without damage, when a stripping pressure is exerted, for example, by means of a strip-off sleeve, against that edge of the finished hose piece which lies in front in the direction of removal. The invention thus produces a form tool by which reinforced hose pieces can be produced by injection moulding with far greater production efficiencies and far lower production costs than with the casting methods, and the tool costs thereof are significantly lower than the tool costs of the injection moulds with divided mould cores, which latter mentioned injection moulds were tried for injection moulding of reinforced hose pieces.

Figure 2:
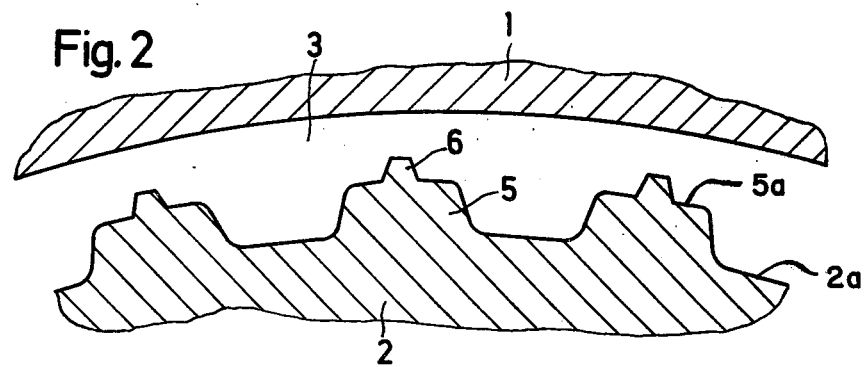
Figure 3:
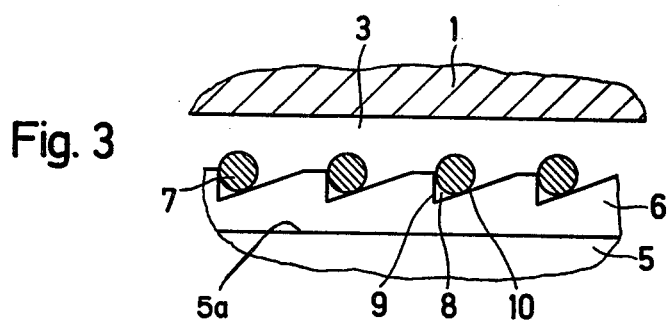

In the drawing an embodiment example of a form tool according to the invention is illustrated, and indeed it shows FIG. 1 an axial longitudinal section;

FIG. 2 a partial cross-section according to the lines II—II in FIG. 1 in an enlarged illustration;

FIG. 3 a section from FIG. 1 in enlarged illustration.

The drawing shows a mould or form tool for injection moulding of a reinforced or fortified tube or hose piece with a toothed inner side, from which rings with a desired width can be cut-off as endless toothed belts. The mould tool substantially comprises a mould sleeve or tube 1 and a one-part integral mould core 2, the latter being removeable from the mould sleeve. End plates 11 are mounted on both ends of the mould sleeve 1, and the mould core 2 is mounted in the end plates 11 coaxially centered thereby in the mould sleeve 1. The mould sleeve 1 and the mould core 2 form an annular cylindrical hollow mould space 3 therebetween. On one face edge of the hollow mould space 3 there is located an injection channel 4, by means of which in the axial direction of the form tool, an injectable material, for example a liquid synthetic material or plastic is injected into the hollow mould space 3 under pressure. For the formation of the inner-toothed hose piece, the mould core 2 on its cylindrical outer surface 2a is provided with axially extending teeth 5, which teeth form the interstitial gaps of the teeth of the inner-toothed hose piece. Axially extending supporting ribs 6 are arranged on the head-surfaces of the teeth 5. Before the injection moulding operation, the mould core is coil-like or helically wound with a wire-shaped reinforcement insert 7. In this manner the windings of the reinforcement insert are held by the supporting ribs 6 at a radial distance from the shaping surface 5a of the winding core, that is from the head surfaces 5a of the teeth 5, in order to insure that the windings of the reinforcement insert do not lie on the head surfaces of the teeth 5, but rather aside from the very small contact point with the supporting ribs 6, are completely surrounded by the injectable material and are embedded in the injectable material in the desired cross-sectional plane of the hose piece, respectively, of the finished endless toothed belts. The supporting ribs 6 have recesses 8 at the spacing of the windings of the reinforcement insert, the windings of the reinforcement insert being set in these recesses during the winding on the mould core. These recesses 8 are formed sawtooth-like and in the injection direction toward the back have a steep flank 9, by which the windings of the reinforcement insert are supported in the injection direction, so that the windings of the fortified insert cannot axially shift on the supporting ribs 6 under the action of the injection pressure of the material which enters in the hollow mould space. Toward the front, that is counter to the injection direction, the sawtooth-like recesses 8 have a flatly inclined ascending flank 10. These flatly inclined ascending flanks 10 of the recesses 8 make it possible that after removal of the mould core 2 from the mould sleeve 1 after first removing one of the end plates 11, the finished reinforced hose piece can be stripped from the one-part mould core 2 opposite to the injection direction, in the manner that one only needs to press against the hose piece from that end of the mould core which is remote from the injection place 4, whereby as a result of the elasticity of the hose piece and of the coil or helically-formed course of the reinforcement insert, the individual windings of the reinforcement insert move upwardly along the circumference of the hose piece successively on the flatly inclined flanks 10 of the recesses 8 and can climb out from the recesses and can be shifted along the supporting ribs.

I claim:

1. A form tool for the production of a hose shaped piece from an injectable material with a reinforcing pull-resistant wire means embedded therein and extending in the circumferential direction of the hose piece, the form tool comprising for production by injection moulding
   an injection moulding device comprising,
   a mould sleeve having a substantially cylindrical inner surface,
   end plates mounted at both ends of said mould sleeve, at least one of said end plates being detachable from said mould sleeve,
   a mould core having a substantially cylindrical outer surface being disposed inside of said mould sleeve and being withdrawable from said mould sleeve in an axial direction thereof, said mould core being mounted in said end plates and centered within said mould sleeve at both ends thereof by said end plates and defining with said mould sleeve an annular hollow mould space having a radial width greater than the diameter of the wire means, said mould core being sealingly closed at both ends thereof by said end plates, respectively,
   an injection channel means disposed in one of said end plates, communicating with one end of said mould space, for injecting with injection pressure an injectable material into said mould space in an axial injection direction of the form tool,
   said mould core being formed on said outer surface with a plurality of longitudinal supporting ribs spaced apart in the circumferential direction of and extending in the axial direction of said mould core,
   said supporting ribs constituting means for spacing said wire means at a predetermined radial distance from said outer surface of said mould core, while supporting and spacing said wire means simultaneously at a radial distance spaced from said inner surface of said mould sleeve,
   said supporting ribs defining recesses adapted for receiving said wire means therein with the latter wound on said supporting ribs, said recesses being respectively arranged in said supporting ribs at predetermined distances in the longitudinal and circumferential directions of said supporting ribs in such a manner that said recesses form a predetermined helical line corresponding to a desired helical course for said wire means within the hose piece to be produced,
   said recesses each having a sawtooth-like shape including a steep flank facing said injection channel means adapted to support said wire means in said injection direction and defining a depth of said recesses adapted for the injection moulding for preventing said wire means from rising over said steep flank out of said recesses under the force of the injection pressure during the injecting of the injectable material into said mould space,
   said recesses also each including an inclined flank facing in a direction away from said injection channel means and flatly ascending in a removal direction counter to said injection direction, and adapted for enabling windings of said wire means to climb over said inclined flanks and to shift along said supporting ribs during axial stripping a finished hose piece over said mould core under a stripping pressure against the hose piece in the removal direction.

2. The form tool as set forth in claim 1, wherein said outer surface of said mould core includes a plurality of mould teeth projecting radially from said outer surface of said mould core and extending axially therealong, said mould teeth define head surfaces, respectively, said supporting ribs are formed on said head surfaces, respectively, of said mould teeth projecting therefrom, said steep flank and said inclined flank define said recesses, respectively, therebetween at said supporting ribs, said recesses being radially outwardly spaced from said head surfaces, whereby the wire means is disposed in said recesses spaced apart from said head surfaces.

3. The form tool as set forth in claim 1, further comprising in combination
   wire means constituting a strand is positioned in said recesses spaced from said cylindrical inner surface of said mould sleeve and is helically wound around said mould core.

4. The form tool as set forth in claim 3, wherein said strand is a single helically wound wire.

5. The form tool as set forth in claim 3, wherein said strand has a substantially circular cross-section,
   said steep flank and said inclined flank are substantially linear, respectively,
   said strand contacts both said inclined flank and said steep flank each at single tangential points, respectively, spaced from each other,
   said steep flank and said inclined flank meet in a deepest portion of said recesses between said single tangential points spaced from said strand defining a substantially triangular opening adapted to be embedded with the injectable material covering said strand substantially radially inwardly.

6. The form tool as set forth in claim 5, wherein
   said supporting ribs have a flat outermost surface connecting each said inclined flank of one recess with said steep flank of an adjacent recess,
   said flat outermost surfaces between adjacent recesses extends longitudinally planarly aligned on said supporting ribs.

7. A method for injection moulding of reinforced hose pieces comprising the steps of helically winding a reinforcement strand on a substantially cylindrical mould core, with the strand being spaced from an inner surface of an outer concentrically disposed mould sleeve as well as from a substantially cylindrical outer surface of the mould core, contacting the strand on the mould core in helically aligned respective recesses of longitudinal supporting ribs on the mould core such that the strand contacts the supporting ribs in each recess at two substantially tangential spaced contact points of its cross-section, injecting under pressure an injectable moulding material from one end of the mould core and mould sleeve opposite to one of the contact points, between the mould core and the mould sleeve completely embedding and covering the strand except at the contact points, said one of the contact points being supported on a side of the cross-section of the strand opposite to the direction of injecting and being supported on a steep flank of the corresponding recess, solidifying the injected material, removing the mould core from the mould sleeve, removing a moulded reinforcement hose piece from the mould core by pressing the hose piece in a removal direction towards the other contact point, the latter being supported on a flatly inclined flank of the recesses ascending in the removal direction, whereby a hose piece having the strand completely embedded except on said two contact points is produced and removed.

* * * * *